(12) United States Patent
Jivsov

(10) Patent No.: US 6,904,521 B1
(45) Date of Patent: Jun. 7, 2005

(54) NON-REPUDIATION OF E-MAIL MESSAGES

(75) Inventor: Andrey Jivsov, Mountain View, CA (US)

(73) Assignee: Networks Associates Technology, Inc., Santa Clara, CA (US)

(*) Notice: Subject to any disclaimer, the term of this patent is extended or adjusted under 35 U.S.C. 154(b) by 893 days.

(21) Appl. No.: 09/784,967

(22) Filed: Feb. 16, 2001

(51) Int. Cl.$^7$ .............................................. H04L 9/32
(52) U.S. Cl. .................. 713/155; 713/156; 713/170
(58) Field of Search ........................ 713/155, 156, 713/168, 170, 176, 177; 380/255, 257

(56) References Cited

U.S. PATENT DOCUMENTS

| | | | | |
|---|---|---|---|---|
| 5,710,816 A | * | 1/1998 | Stork et al. | 380/257 |
| 6,009,173 A | * | 12/1999 | Sumner | 713/156 |
| 6,044,463 A | | 3/2000 | Kanda et al. | 713/168 |
| 6,158,003 A | * | 12/2000 | Kara | 713/168 |
| 6,510,513 B1 | * | 1/2003 | Danieli | 713/156 |
| 6,532,543 B1 | * | 3/2003 | Smith et al. | 713/201 |
| 6,754,661 B1 | * | 6/2004 | Hallin et al. | 707/100 |

OTHER PUBLICATIONS

Simmons, G. J., "A Protocol to Provide Verifiable Proof of Identity and Unforgeable Transaction Receipts", May 1989, IEEE vol. 7, No. 4, pp. 435–447.*
"Standard for the Format of ARPA Internet Text Messages", Aug. 13, 1982, downloaded on Apr. 4, 2001 from http://www.ietf.org/rfc/rfc822.txt, pp. 1–46.
"Security Multiparts for MIME: Multipart/Signed and Multipart/Encrypted", Oct. 1995, downloaded on Apr. 4, 2001 from http://www.ietf.org/rfc/rfc1847.txt, pp. 1–10.
Bruce Schneier, Applied Cryptography, Protocols, Algorithms, and Source Code in C, 2nd Edition, ((c) 1996, John Wiley & Sons, Inc.) pp. 1–74.
"Multipurpose Internet Mail Extensions (MIME) Part One: Format of Internet Message Bodies", Nov. 1996, downloaded on Apr. 4, 2001 from http://www.ietf.org/rfc/rfc2045.txt, pp. 1–28.
"Hypertext Transfer Protocol—HTTP/1.1", Jan. 1997, downloaded on Apr. 4, 2001 from http://www.ietf.org/rfc/rfc2060.txt, pp. 1–142.
"OpenPGP Message Format", Nov. 1998, downloaded on Apr. 4, 2001 from http://www.ietf.org/rfc/rfc2440.txt, pp. 1–57.
"S/MIME Version 3 Message Specification", Jun. 1999, downloaded on Apr. 4, 2001 from http://www.ietf.org/rfc/rfc2633, pp. 1–29.
"Ontario Court of Appeal Sets Rules for Contracts Entered into by Electronic Facsimile Transmission. Are E–Mail Contracts Affected?", downloaded on Apr. 3, 2001 from http://www.ecommercecanada.net/Archives/Oct15/body_oct15.html, pp. 1–5.

* cited by examiner

*Primary Examiner*—Matthew Smithers
(74) *Attorney, Agent, or Firm*—Swidler Berlin LLP; Christopher J. Hamaty

(57) ABSTRACT

A technique, and system(s) implementing the technique, allow an encrypted message to be sent directly to a recipient, and when the recipient opens the message, the recipient's system sends a request to an arbiter server to retrieve decryption information to decrypt the message. When the arbiter server receives the request for the decryption information, the arbiter server generates evidence of the request and sends the decryption information to the recipient. In this way, an evidentiary trail, that cannot be repudiated, can be used to establish that the recipient received and attempted to open the message.

46 Claims, 9 Drawing Sheets

Arbiter log

NON-REPUDIATION OF E-MAIL MESSAGES

BACKGROUND OF THE DISCLOSURE

1. Field of the Invention

The invention relates to a technique, specifically a method and apparatus that implements the method, that assures that a message sent to a recipient was requested for opening by the recipient. This method is particularly, though not exclusively, suited for use within an e-mail or other electronic messaging application whether used as a stand-alone computer program or integrated as a component into a multi-functional program, such as an operating system.

2. Description of the Prior Art

Electronic messaging, particularly electronic mail ("e-mail") is a preferred method of communications with both individuals and organizations because of its ease of use and low cost. However, e-mail may not provide all the services of postal mail.

Traditional postal mail provides services that may be used to establish an evidentiary record that a letter was received. These services include certified mail and a return-receipt postcard. Certified mail can be used to establish that the post office received an item of mail on a particular date, and a delivery record is maintained by the postal service. When used, the return-receipt postcard is signed by the recipient in order to receive the item of mail and returned to the sender by the post office. Using certified mail and a return-receipt postcard provides evidence that the recipient received the item of mail, which may be difficult, if not impossible, to repudiate.

Typically e-mail systems lack security. Once a sender has sent an electronic message, the sender has no control over whether a specified recipient received the message. Furthermore, if the recipient did receive the message, the sender has no knowledge as to whether the recipient opened the message to read it. Therefore, there is a need for a method and system that assures the sender that a message sent to the recipient was requested for opening by the recipient. That the recipient requested that the message be opened also provides evidence that the recipient received the message.

SUMMARY OF THE INVENTION

The present invention satisfies this need by allowing an encrypted message to be sent directly to a recipient, and when the recipient opens the message, the recipient's system sends a request to an arbiter server to retrieve the information to decrypt the message. When the arbiter server receives the request for the decryption information, the arbiter server generates evidence of the request and sends the decryption information to the recipient. In this way, an evidentiary trail, that cannot be repudiated, can be used to establish that the recipient received and attempted to open that message.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the present invention can be utilized in substantially any e-mail or electronic messaging application to assure that a message that was sent to the recipient was requested for opening. The invention can be readily incorporated into a stand-alone computer program, such as a client e-mail application program for the sender and recipient functionality, or a server e-mail application program for the arbiter functionality, or the invention can be integrated as a component into a multi-functional program, such as an operating system. The client and server e-mail application programs may operate on a personal computer, a hand-held computer such as a personal digital assistant or other types of client terminals such as a cellular telephone system. To simplify the following discussion and facilitate reader understanding, the present invention will be discussed in the context of use within a client e-mail program that executes on a personal computer.

A. Background

Figure 1:
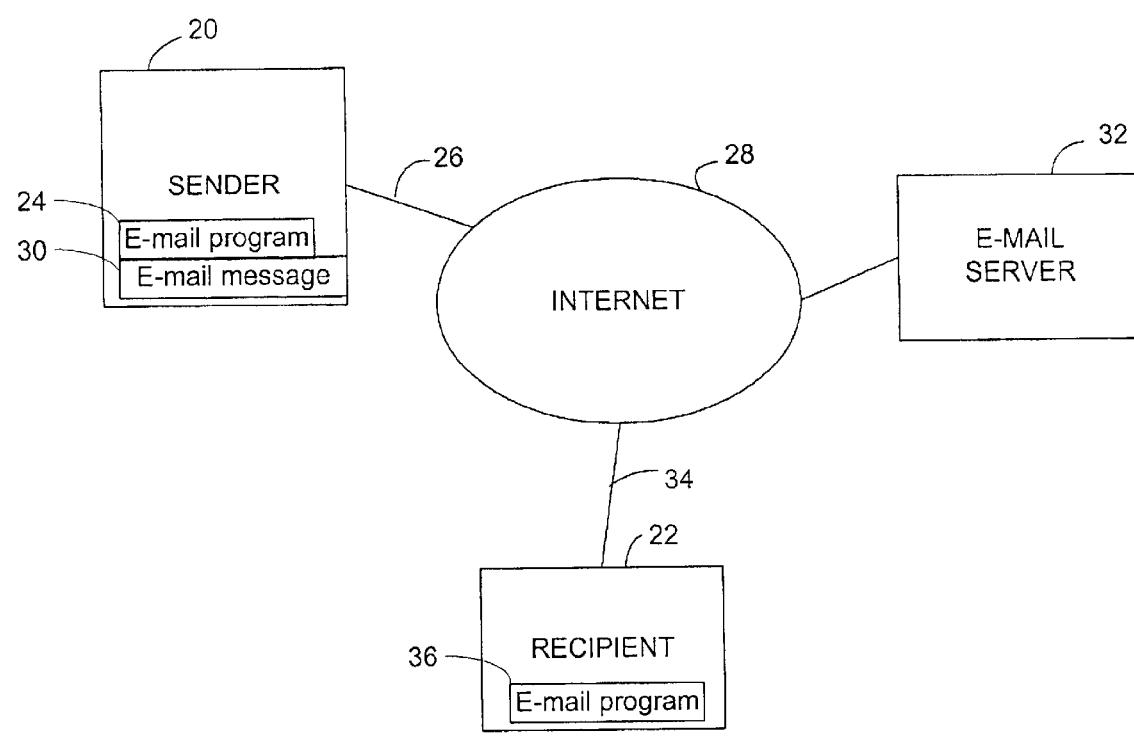
FIG. 1 depicts a high-level block diagram of a sender and recipient as typically would be used to carry e-mail from the sender to one or more recipients.

In this context, FIG. 1 depicts a high-level block diagram of a sender computer 20 and recipient computer 22 as typically would be used to carry e-mail from a sender 20 to one or more recipients 22. The e-mail sender 20 obtains the e-mail addresses of the potential recipients 22 of the message. The sender 20 also creates a body of a message to be sent to each of the recipient's addresses. Once the body of the message and the recipient's e-mail addresses have both been established, the sender 20 then invokes e-mail program 24. The sender also establishes a network connection, here symbolized by line 26, to a suitable electronic communications network, such as here presumably and illustratively Internet 28, capable of reaching the intended addressees. Once the e-mail program 24 is executing, the sender then creates a new outgoing message 30 using this program, then attaches a file containing the body of the message to the new message, and specifies the addresses of the recipients of the new message. Alternately, the sender 20 may create a body of the message in the environment of the e-mail program. Finally, the sender 20 instructs e-mail program 24 to transmit a copy of the new message 30 to each and every recipient 22 using the recipient's e-mail address. If the network connection 26 is operative, the message is transmitted onto the Internet 28 to be transported to its intended recipient 22. If the network connection 26 has not been established, the e-mail program 24 queues each of the messages for subsequent transmission onto the Internet 28 whenever the network connection 26 can next be established. Once each message has been transmitted to its recipient by e-mail program 24, Internet 28 routes that message to the final mail server that services that particular recipient 22.

The sender 20 may send the same message to many different recipients 22. For simplicity, only one recipient 22 is shown. When the recipient 22 attempts to retrieve his(her) e-mail messages from the associated mail server 32, the recipient 22 establishes networked connection 34 to Internet 28 and executes client e-mail program 36—the latter being one of application programs that resides on the recipient computer. E-mail program 36 fetches the mail for this recipient 22 from the associated mail server 32 connected to Internet 28 that services this recipient. The mail comprises the message transmitted by the sender. The client e-mail program 36 downloads this message, stores the message in an incoming message folder and ultimately displays at least a portion of the contents of the incoming message folder. Generally, messages will first be displayed in some abbreviated manner so the recipient can quickly scan through all of his(her) incoming messages. The abbreviated display typically includes, for each such message, its sender (if available), its subject (again if available) and, if a preview mode has been selected, a first few lines of the body of that message itself. If the recipient wants to read an incoming message, (s)he can select that message, typically by "clicking" on it, whereby the client e-mail program will display the body of that message. If the message includes an attachment, the attachment may be also viewed, depending on the e-mail application, by "clicking" on an icon representing the attachment. At this point, the recipient can also save or discard the message.

One problem with the e-mail program 36 is that a knowledgeable recipient may modify his(her) e-mail program 36 so that all evidence of ever receiving a message is removed. At no point in this process is evidence created, that cannot be repudiated, that the recipient received and attempted to open the message. Therefore, the recipient may deny that a message from the sender was ever received.

B. Inventive Non-repudiation of Receipt

1. Overview

Figure 2:
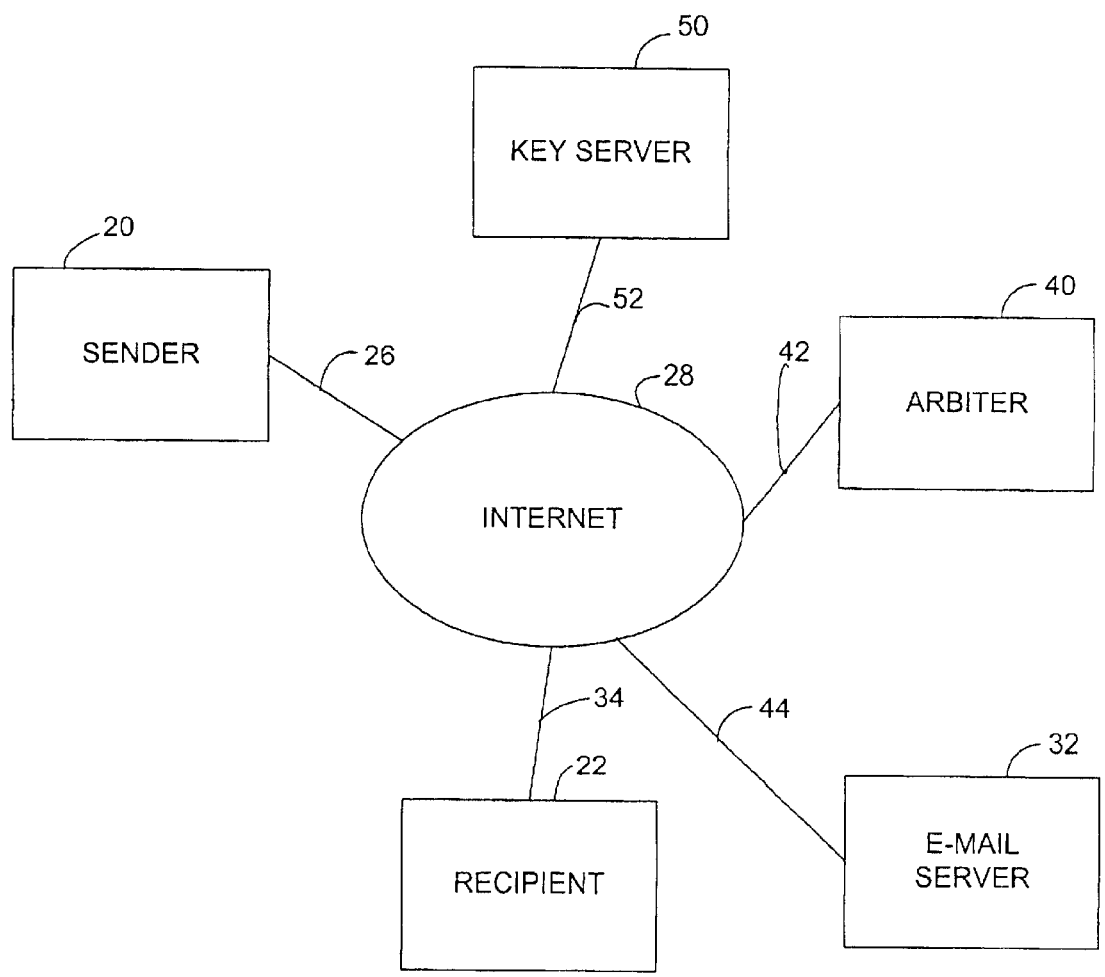
FIG. 2 depicts a high-level block diagram of a sender, recipient, and arbiter server computer as would be used to implement an embodiment of the present invention.

Referring to FIG. 2, the present invention provides proof that the recipient 22 received and requested for opening a sender's e-mail message through the use of a third party, called the arbiter 40. Leads 26, 34, 42, 44 depict connections between the sender 20, recipient 22, e-mail server 32 and arbiter 40 for communication. The invention permits the sender 20 to send the e-mail message directly to the recipient 22 without sending the e-mail message itself to the third party arbiter 40. In particular, the sender 20 initially registers with the third party arbiter 40 to provide the non-repudiation service. The sender 20 encrypts the message which (s)he sends to the recipient 22. Meanwhile, the sender 20 has also sent decrypting information to the arbiter server 40, which the arbiter server 40 stores for later use. When the recipient 22 attempts to open the encrypted e-mail message, the recipient client e-mail program 22 sends a request to the arbiter server 40 for the decryption information. In response to the request, the arbiter server 40 returns the requested decryption information to the recipient 22 and creates evidence that cannot be repudiated by the recipient 22, that the recipient 22 attempted to open the e-mail message. When the recipient client computer 22 receives the decryption information, the recipient client 22 decrypts the encrypted message and displays the decrypted message.

An optional key server 50, connected to the internet via lead 52, provides authentic public keys of the sender 20 and one or more recipients 22 for encryption or signature verification.

Figure 3:
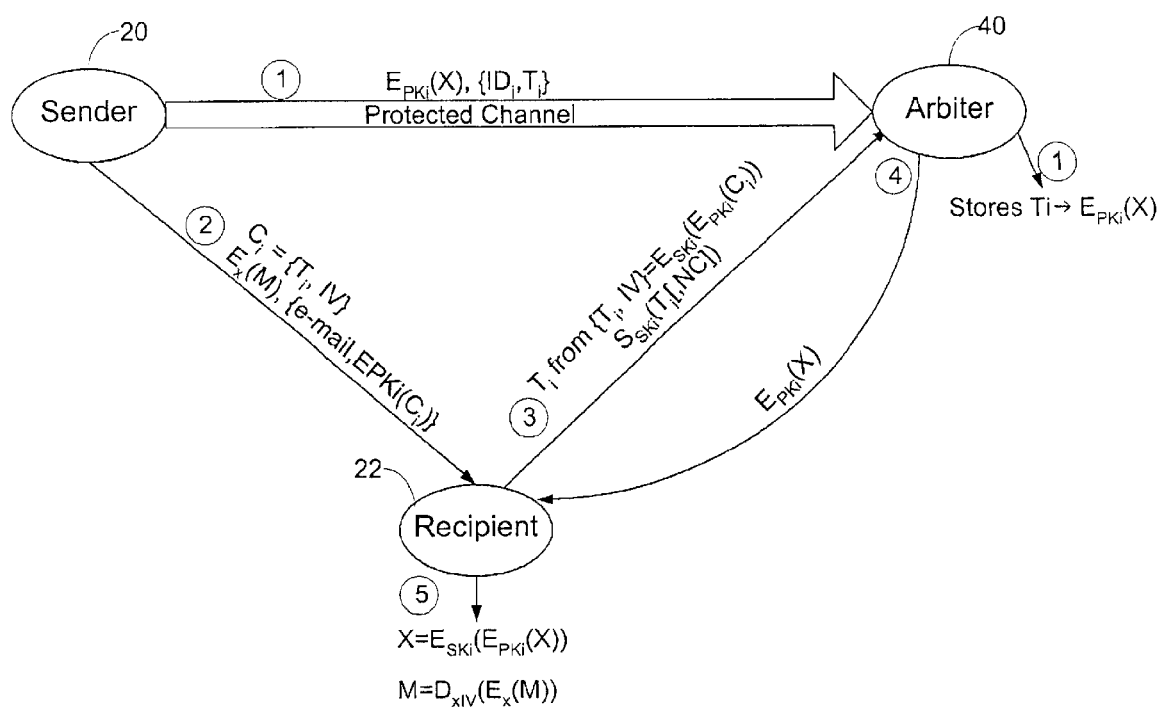
FIG. 3 depicts a high-level diagram of a protocol among the sender computer, recipient computer and arbiter server computer of the claimed invention.

FIG. 3 illustrates a protocol between the sender 20, recipient 22 and arbiter 40 that provides evidence that the recipient 22 received and attempted to open an e-mail message received from the sender 20. The sender 20 is the party that sends e-mail to the recipient 22 and requests notification from the arbiter 40 when the recipient 22 opens the e-mail.

The recipient 22 is the intended final destination for the message from the sender 20 and whose access to the content of the e-mail message is being monitored. The recipient 22 has control of his(her) e-mail program and may modify the e-mail program. For example, the recipient may modify his(her) e-mail program to hide the fact that (s)he opened an e-mail message. In FIG. 3, for simplicity, the recipient's e-mail server is not shown.

The arbiter 40 is a third party that monitors access to the content of the e-mail by recipients 22. In particular, the arbiter 40 is a trusted third party. The level of trust expected from the arbiter 40 is that the arbiter 40 stores what the sender 20 told the arbiter 40 to post and returns the information requested by the recipient 22. The arbiter 40 may identify the sender 20. The arbiter 40 may gather that information specified by and received from the recipient 22, in a request for decryption information. However, the arbiter 40 does not actively contact the recipient 22 to gather information about the recipient 22.

In one embodiment, the arbiter 40 is implemented on a computer system that is separate from the sender 20. In an alternate embodiment, the arbiter 40 may be implemented on the same computer system as the sender 20 if procedures are in place to assure a fourth party, independent from the sender 20, recipient 22 and arbiter 40, that no ore is tampering with the arbiter 40. The arbiter 40 is independent from the recipients 22; that is, the arbiter 40 is not implemented on nor controlled by a recipient's computer system.

A protected channel connects the arbiter 40 with the sender 20, and optionally, the arbiter 40 with the recipient 22. The protected channel provides at least provides confidentiality and authentication of the arbiter 40 to the sender 20. Alternatively, sender 20 may authenticate itself to the arbiter 40.

Both the sender 20 and the recipient 22 communicate with the arbiter 40. Before sending a message, the sender 20 communicates with the arbiter 40 to inform the arbiter 40 to monitor the disposition of the sender's message by one or more recipients 22. After sending the message to the recipient 22, the sender 20 has no control over how and when the message reaches the recipient 22. The message is subject to passive and active attacks as it is being transported to the recipient 22. Passive attacks include reading the message; active attacks include modifying the message. The recipients 22 communicate with the arbiter 40 when attempting to open the message.

In one implementation, the method uses the Simple Mail Transport Protocol (SMTP).

The sender 20 and recipients 22 may use any public key and symmetric key cryptography algorithms and message encoding formats. In one implementation, the method uses Pretty Good Privacy (PGP) mail clients. In that case, the sender 20 and recipient 22 access the PGP key server for authenticated public keys.

Table 1, below, illustrates the cryptographic protocol in accordance with an embodiment of the present invention. The following notation is used in FIG. 3 and Table 1:

X represents a session encryption key; other names for X are a secret encryption key, symmetrical encryption key or bulk encryption key;

$E_{PKi}(X)$ represents the encrypted session key X, in which the session key X is encrypted using the public key for recipient i;

$ID_i$ represents a supplemental identifier associated with recipient i; in one embodiment, the supplemental identifier is a random number and each recipient is associated with a distinct supplemental identifier;

$T_i$ represents a transaction identifier, a random nonce, associated with recipient i; each recipient and e-mail message pairing is associated with a distinct transaction identifier; in one implementation, the transaction identifier has at least 512 bits;

M represents the body of the message to be encrypted;

$E_X(M)$ represents encrypted message M where M is encrypted using the session key X;

IV represents an initialization vector for $E_X(M)$;

$C_i$ represents a concatenation of the transaction identifier $T_i$ and the Initialization vector IV for recipient i; $E_{PKi}(C_i)$ represents the result of encrypting $C_i$ with the public key $PK_i$ for recipient i;

$SK_i$ represents recipient i's private key, that is associated with that recipient's public key;

$E_{SKi}(E_{PKi}(C_i))$ represents the result of decrypting $E_{PKi}(C_i)$ using the private key $SK_i$ for recipient i; and $D_X(E_X(M))$ represents the result of decrypting $E_X(M)$ using the key X;

TABLE 1

| | Cryptographic Protocol | | |
|---|---|---|---|
| N | Sender | Recipient | Arbiter |
| 1 | Posts: $E_{PKi}(X)$ and {$ID_i$, $T_i$} for specified recipients to the arbiter. | | Receives the posting from the sender and stores the association of $T_i$ and $E_{PKi}(X)$ for each recipient. |
| 2 | Composes and sends e-mail: $E_X(M)$, {recipient's e-mail address$_i$, $E_{PKi}(C_i)$}. | | |
| 3 | | Computes: $T_i$ from $E_{SKi}(E_{PKi}(C_i))$ for i | |

TABLE 1-continued

| | Cryptographic Protocol | | |
|---|---|---|---|
| N | Sender | Recipient | Arbiter |
| | | corresponding to the e-mail. Send: $T_i$ or Signed $S_{SKi}(T_i [,NC])$ to the arbiter. | |
| 4 | | | Receives $T_i$ or $S_{SKi}(T_i [,NC])$ as proof that recipient i received and attempted to open the message. Returns: $E_{PKi}(X)$ corresponding to the $T_i$. |
| 5 | Computes: $X = E_{SKi}(E_{PKi}(X))$ and $M = D_X(E_X(M))$ using IV. | | |

The protocol will be described with respect to both FIG. 3 and Table 1. The exchange numbers N of Table 1 correspond to the circled exchange numbers of FIG. 3. Prior to exchange 1, the sender has acquired the e-mail address and public key $PK_i$ for each recipient i. In exchange 1, the sender 20 generates a session key X. For each recipient 22, the sender 20 then encrypts the session key X with the public key of the recipient $PK_i$ to produce an encrypted session key $E_{PKi}(X)$ for that recipient. The sender 20 then sends the encrypted session key $E_{PKi}(X)$, supplemental identifier $ID_i$ and the transaction identifier $T_i$ for posting on the arbiter server. The arbiter server receives the posting and stores the associated supplemental identifier $ID_i$, transaction identifier $T_i$ and encrypted session key $E_{PKi}(X)$ for each recipient i. In an alternate embodiment, the supplemental identifier $ID_i$ is not used. In one implementation, in response to the sender clicking on a send button to send the e-mail, an HTTP POST method is executed which performs the posting of exchange 1.

The connection between the sender 20 and arbiter 40 is a protected channel. Specifically, the protected channel can be implemented using Transport Layer Security (TLS) over Hypertext Transfer Protocol (HTTP). In an alternate embodiment, the protected channel can be implemented by encrypting the exchanges with the Arbiter's public key.

In exchange 2, the sender 20 composes and sends the e-mail to the recipient 22. The sender 20 creates a message M, which (s)he encrypts using the session kev X to produce an encrypted message $E_X(M)$. For each recipient i, the sender 20 encrypts the concatenation of the initialization vector IV and the transaction identifier $T_i$ using the public key $PK_i$ for that recipient to produce an encrypted concatenation $E_{PKi}(C_i)$. The sender 20 sends an e-mail that comprises the encrypted message $E_X(M)$ and the encrypted concatenation $E_{PKi}(C_i)$ to the e-mail address of each respective recipient 22. The encrypted message $E_X(M)$ and the encrypted concatenation $E_{PKi}(C_i)$ may be sent as an e-mail attachments. Alternately, the encrypted message $E_X(M)$ may be sent in the text of the e-mail. The Internet routes the e-mail messages to the mail server associated with each recipient.

In exchange 3, the recipient client computer 22 accesses the associated e-mail server to retrieve any e-mail messages. The e-mail messages, if any, are downloaded into the recipient computer 22, and the abbreviated list of messages is displayed at the recipient's client computer. In response to the recipient "clicking" on an encrypted message, whether sent in the body of the e-mail or an attachment, to open it, a warning message may be displayed stating that access to that message will be monitored. Alternately, no warning message is displayed. If the recipient 22 chooses to open the message or if no warning message is displayed, the client e-mail program invokes a method to retrieve the encrypted session key $E_{PKi}(X)$ from the arbiter. In particular, the method applies the recipient's private key $SK_i$ to the encrypted concatenation $E_{PKi}(C_i)$ to extract the transaction identifier $T_i$ associated with the e-mail.

Once the transaction identifier $T_i$ is identified, the recipient 22, depending on the embodiment, may request the encrypted session key by sending the transaction identifier $T_i$ to the arbiter 40.

Along with the transaction identifier $T_i$, the recipient 22 may include a generated nonce NC. The purpose of the nonce NC is to provide the recipient 22 with a way to include his(her) private data in the records on the arbiter server 40. For example, the recipient 22 may use the nonce NC to look up records that may be stored, in a database or files, on the recipient's computer. The nonce NC is opaque to the arbiter server 40 and the arbiter server 40 cannot remove the nonce NC. The recipient 22 signs, with the recipient's private key $SK_i$, a concatenation of the extracted transaction identifier $T_i$ and the nonce NC, and sends the signed concatenation $S_{SKi}(T_i,NC)$ to the arbiter server 40 to request the encrypted session key.

In yet another embodiment, the nonce NC is optional. In another embodiment, only transaction identifier $T_i$ is sent to the arbiter server 40.

In one embodiment, exchange 3 uses the same protected channel as in exchange 1. Alternately, exchange 3 does not use a protected channel. Depending on the type of signature used, the signature may disclose the identity of the signer and this information may be used to mount a selective denial of service attack. To prevent this, the recipient can request the encrypted session key $E_{PKi}(X)$ as many times as needed for a predetermined period of time.

In exchange 4, the arbiter server 40 receives the request for the encrypted session key. The request may take the form of any of the embodiments described above with respect to exchange 3. The arbiter server 40 receives the transaction identifier $T_i$ in unencrypted form. The arbiter server 40 searches for the encrypted session key $E_{PKi}(X)$ associated with that transaction identifier $T_i$, logs that a request for the encrypted session key $E_{PKi}(X)$ was received, and returns the encrypted session key $E_{PKi}(X)$ associated with the transaction identifier $T_i$ to the recipient 22.

If a signature is used, the signature is a clear text signature of the transaction identifier $T_i$. The arbiter server 40 receives the transaction identifier $T_i$ from recipient i in unencrypted form so that the arbiter can extract the transaction identifier $T_i$ without applying any cryptographic operations.

In exchange 5, after the recipient's client e-mail program receives the encrypted session key $E_{PKi}(X)$, the recipient's client e-mail program decrypts the encrypted session key $E_{PKi}(X)$ using the recipient's private key $SK_i$ to retrieve the session key X in unencrypted form. The recipient's client e-mail program decrypts the encrypted message $E_X(M)$ using the session key X as well as the initialization vector IV to provide message M in unencrypted form.

The supplemental identifier $ID_i$ field provides application-specific identification of the transaction for the sender without revealing details to the arbiter server. For example, for PGP encryption, the supplemental identifier $ID_i$ field may comprise any number of the following elements, alone or in combination, a key identifier, a timestamp, a pseudo-random number, or e-mail address. The choice of elements depends on the desired amount of identity protection.

To address the needs of devices with limited computational resources, cryptographic computation on the sender client can be reduced by storing pre-computed values such as $C_i$ and $E_{PKi}(C_i)$ for most frequently used recipients from, or alternately every, recipient i in his(her) address book.

2. Sender

Figure 4:
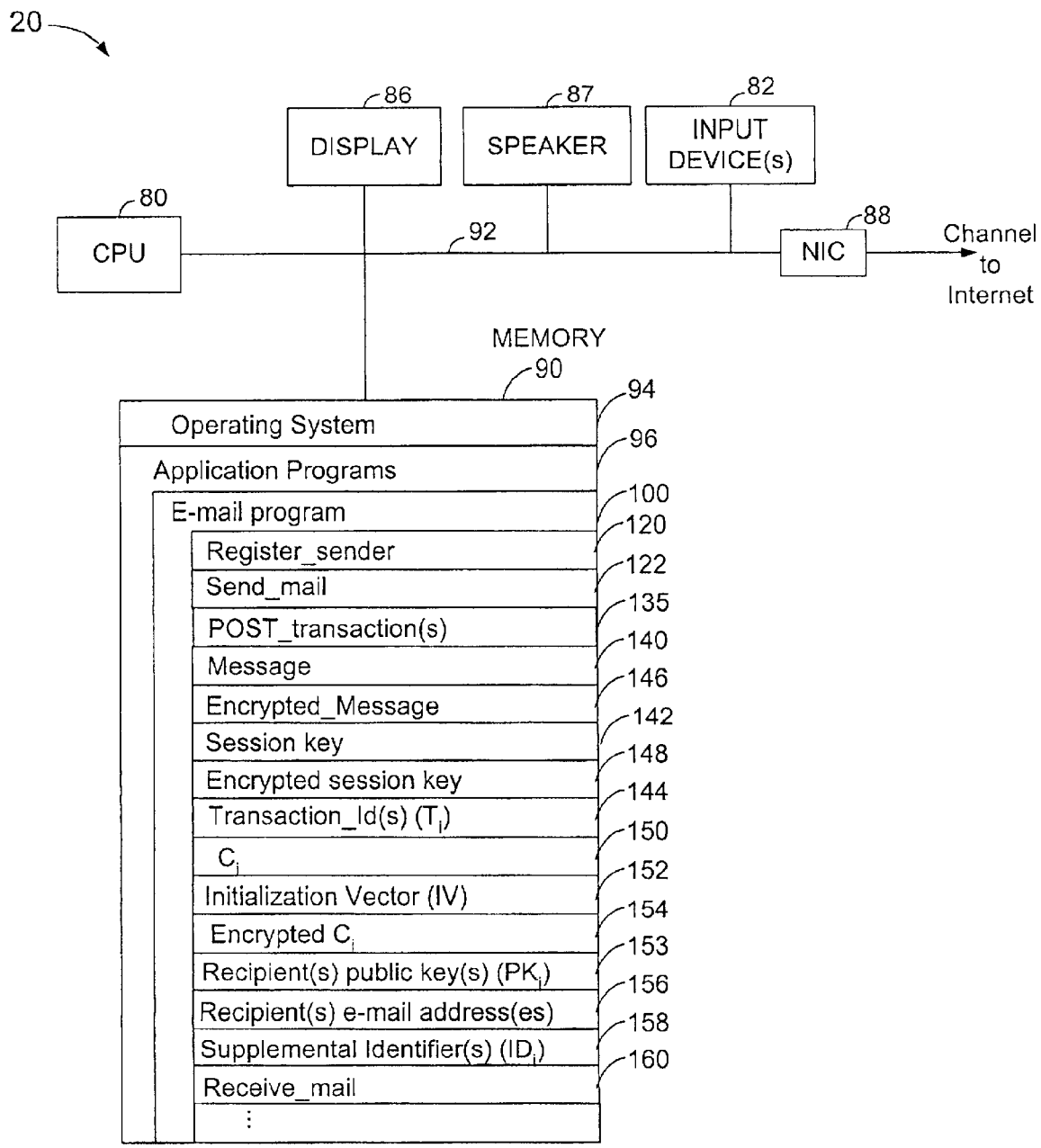
FIG. 4 depicts a high-level block diagram of a subset of software modules and data of an e-mail program, that executes within the sender computer of FIG. 2, which embodies the present invention.

FIG. 4 depicts a high-level block diagram of the sender's client computer system 20 on which the present invention can be implemented. Computer system 20 comprises a processor 80, one or more input device(s) 82, display 86, speaker 87, communications interface (network interface card (NIC)) 88, and memory 90, all conventionally interconnected by bus 92. The input device(s) may comprise any one or a combination of a keyboard, mouse, push buttons, microphone for audio input or stylus and pad for handwritten input. Memory 90, which generally includes different modalities (all of which are not specifically shown for simplicity), illustratively random access memory (RAM) and hard disk storage, stores operating system (O/S) 94 and application programs 96. Where the invention is incorporated within a client e-mail program 100—as in the context of the present discussion, the specific software modules that implement our invention would be incorporated within application programs 96 and particularly within client e-mail program 100 therein. O/S 94 may be implemented by any conventional operating system, such as the WINDOWS NT operating system (WINDOWS NT being a registered trademark of Microsoft Corporation of Redmond, Wash.). The client e-mail program 100 being one of application programs 96, executes under control of O/S 94.

Through the input device 82 and display 86, a user, as a sender 20 or recipient 22, can instruct the client computer 20 to display the contents of, e.g., his(her) mail folder on display 86, and, upon appropriate manual selection through the input device 82, any particular message in its entirety contained in that folder.

Since the specific hardware components of computer system 20 as well as all aspects of the software stored within memory 90, apart from the specific modules that implement the present invention, are conventional and well-known, they will not be discussed in further detail.

Figure 5:
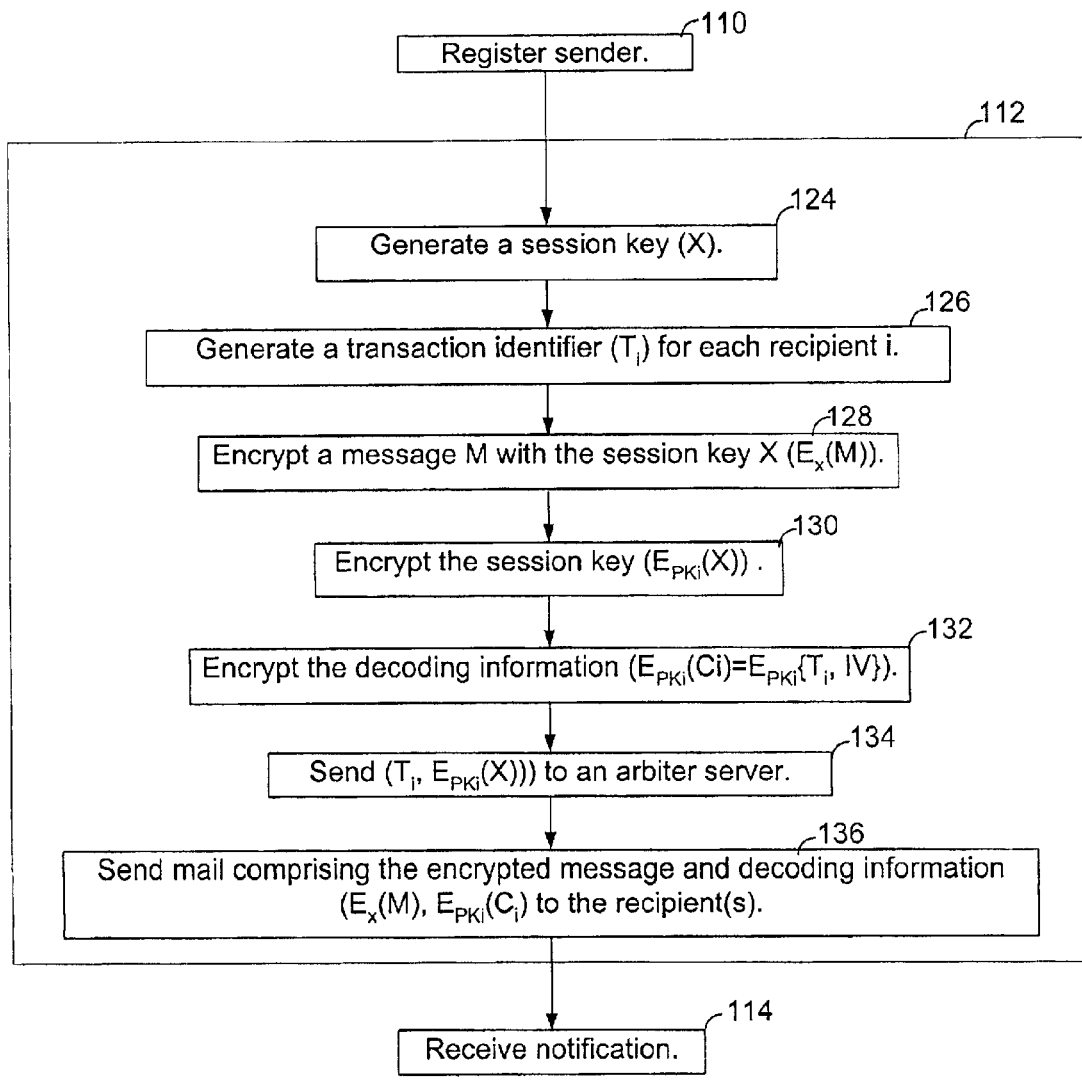
FIG. 5 depicts a high-level flowchart of a technique at the sender computer that collectively uses the software modules and data of FIG. 4 in implementing an embodiment of the present invention.

To facilitate understanding, the reader should simultaneously refer to both FIGS. 4 and 5 throughout the following discussion. FIG. 4 also depicts a subset of software modules and data of the e-mail program 100, that executes within the sender computer of FIG. 2, which embodies the present invention. FIG. 5 depicts a high-level flowchart of a technique at the sender computer 20 that collectively uses the software modules and data of FIG. 4 in implementing an embodiment of the present invention. The e-mail program 100 of FIG. 3 is stored as executable instructions and, as appropriate, data in memory 90, and is executed within sender client computer 20, to send the encrypted session key and associated transaction identifier to the arbiter server for each recipient and to send the encrypted message to each recipient.

The technique of the present invention is implemented in the e-mail program 100 and has the following general steps. First the sender executes the e-mail program 100. Next the sender registers with the arbiter server 110 (FIG. 5). Registration identifies the sender to the arbiter server 110, and provides the necessary accounting information for billing the sender for the arbiter server's services. Registration may also provide notification information for the arbiter server that is used to notify the sender when a recipient has received and attempted to open an e-mail message. This can be done within environment of the e-mail program 100, or alternately, the sender registers directly with the arbiter server via a web site, rather than the register_sender procedure 120 in the e-mail program 100. Registration is performed once for a specific sender.

In the steps of block 112, the sender then sends the encrypted session key to the arbiter server and sends the encrypted message to the recipient. Finally in step 114, the sender receives a notification from the arbiter server when the recipient receives and attempts to open the e-mail.

More particularly, referring also to FIG. 5, in step 110, the sender first registers with the arbiter server using the register_sender procedure 120. The register_sender procedure 120 may be invoked by clicking on a button, or selecting a menu item, displayed by the e-mail program.

To send an e-mail, the sender indicates that (s)he wants to compose an e-mail by, depending on the e-mail program, clicking on a button which activates the write_mail procedure which causes a write message screen to be displayed. The sender composes the message 140 either as the body of the text on the write message screen, or imports a file containing the message to be sent. After composing the message, the sender indicates to the e-mail program that the message is to be encrypted by selecting, depending on the implementation, a button, checkbox or a menu item in the graphical user interface of the e-mail program. In response to the sender clicking on the "send" button, a send_mail procedure 122 is invoked. The send_mail procedure 122, in step 124, generates the session key X 142. In step 126, The send_mail procedure 122 generates the distinct transaction identifier $T_i$ 144 for each recipient i. More specifically, transaction identifiers $T_i$ are unique to each recipient i and e-mail message pair. The transaction identifier $T_i$ 144 is a pseudo-random number.

In step 128, the send_mail procedure 122 encrypts the message M, either the text in the body of the e-mail or an attached file depending on the embodiment, using the session key X to produce the encrypted message $E_X(M)$ 146. In step 130, the send_mail procedure encrypts, for each recipient i, the session key X using the public key for that recipient i to produce the encrypted session key $E_{PKi}(X)$ 148. In step 132, the send_mail procedure encrypts the concatenation $C_i$ 150 of the transaction identifier $T_i$ 144 and the initialization vector IV 152 for each recipient i using the public key for that recipient 153 to produce encrypted transaction information which may attached as a separate file to the e-mail. In one embodiment, a single file that contains the transaction information for all recipients is used. In an alternate embodiment, each recipient receives a file that contains only that recipient's transaction information.

In step 134, the send_mail procedure sends the associated transaction identifier $T_i$ and the encrypted session key for each recipient to the arbiter server. In one embodiment, an HTTP POST method, referred to as POST_transaction(s) 135, is used to perform such function. An exemplary POST method will be further described below.

In step 136, the send_mail procedure sends the encrypted message 146 and the encrypted transaction information to each recipient $E_{PKi}(C_i)$ 154. The encrypted decoding information is sent to the recipient along with the encrypted message. When using PGP, the arbiter server may be specified as a "literal packet" and the encrypted message $E_X(M)$ is encapsulated as a "Symmetrically Encrypted Data Packet." The e-mail address, e-mail, and encrypted concatenation $E_{PKi}(C_i)$ are represented as a new "Receipt request packet" comprising a "User ID packet" for the user name and the e-mail, and a "Public-key encrypted Session key packet" for the encrypted concatenation $E_{PKi}(C_i)$.

Alternately the encrypted transaction information may be sent as a field in the header of e-mail containing the encrypted message. In the case of SMTP, when sending e-mail to the recipients, the sender specifies the URL of the arbiter as an SMTP header field such as X-Receipt-Arbiter: http://arbiter.abc.com/legal/brokerage/John When the recipient client contacts the arbiter server for the encrypted session key, in step 218, the sender may receive a notification from the arbiter. In one embodiment, the notification comprises an e-mail message. Alternately, the notification may comprise a voice message. In another alternate embodiment, the arbiter server does not notify the sender, and the sender accesses the arbiter server to determine whether the recipient(s) received and attempted to open their respective e-mail message. The sender can perform a guaranteed revocation of his(her) e-mail message if the message has not been read.

An exemplary HTTP POST method 135 that posts the encrypted session key, the transaction identifier ($T_i$) and the supplemental identifier is shown below. The sender posts data as MIME "multipart/mixed" as defined in "Multipurpose Internet Mail Extensions (MIME) Part One: Format of Internet Message Bodies", by Freed, N., and Borenstein, N., RFC 2045, Innosoft, First Virtual, November 1996. The content type is application/receipt and "parameter" is the "key_id" for the supplemental identifier $ID_i$. The transaction identifier $T_i$ is "t_id", and the encrypted session key $E_{PKi}(X)$ is "key-encrypted."

POST/HTTP/1.1
Accept: */*
Date: Tue, 15 Nov. 2001 08:11:31 GMT
Referer: http://arbiter.abc.com/
Content-Type: multipart/mixed; boundary=b_post
Accept-Encoding: gzip, deflate
User-Agent: xxx
Host: arbiter.abc.con
Content-Length: xx
--b_post
Content-Type: application/receipt; parameter=key_id
Content-Transfer-Encoding: base64
XXXXX [base64, encoded IDi]
--b_post
Content-Type: application/receipt; parameter=t_id
Content-Transfer-Encoding: base64
XXXXX [base64, encoded Ti]
--b_post
Content-Type: application/receipt;parameter=key_encrypted
Content-Transfer-Encoding: base64
XXXXX [base64, encoded $E_{PKi}(X)$]
--b_post In addition, the sender can interactively log on the arbiter and manage his(her) receipts account. For instance, the sender can verify that his(her) e-mail was received, and perform a guaranteed revocation of his(her) e-mail message if the message has not been read.

The memory 90 may also store the e-mail addresses of the recipient(s) 156, and the supplemental identifier(s) 158, described above. The e-mail program 100 also comprises a receive_mail procedure 160 that provides recipient capabilities that will be described below.

3. Recipient

Figure 6:
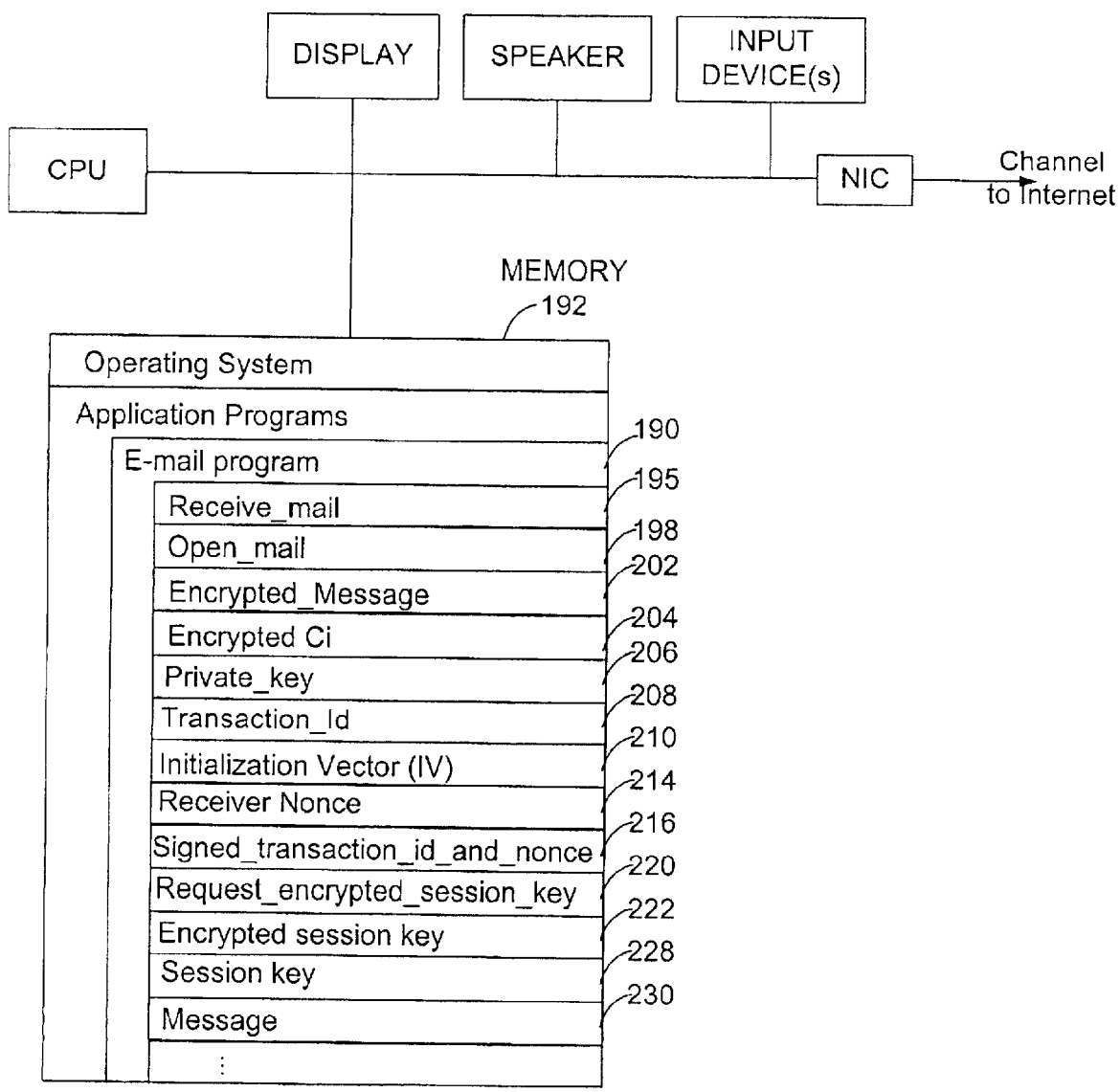
FIG. 6 depicts a high-level block diagram of a subset of software modules and data of an e-mail program, that executes within the recipient computer of FIG. 2, which embodies the present invention.

FIG. 6 depicts a high-level block diagram of the recipient's client computer (PC) 22 on which the present invention can be implemented. The recipient's computer system 22 has many of the same components as the sender's computer system, and similar components will not be described again.

Figure 7:
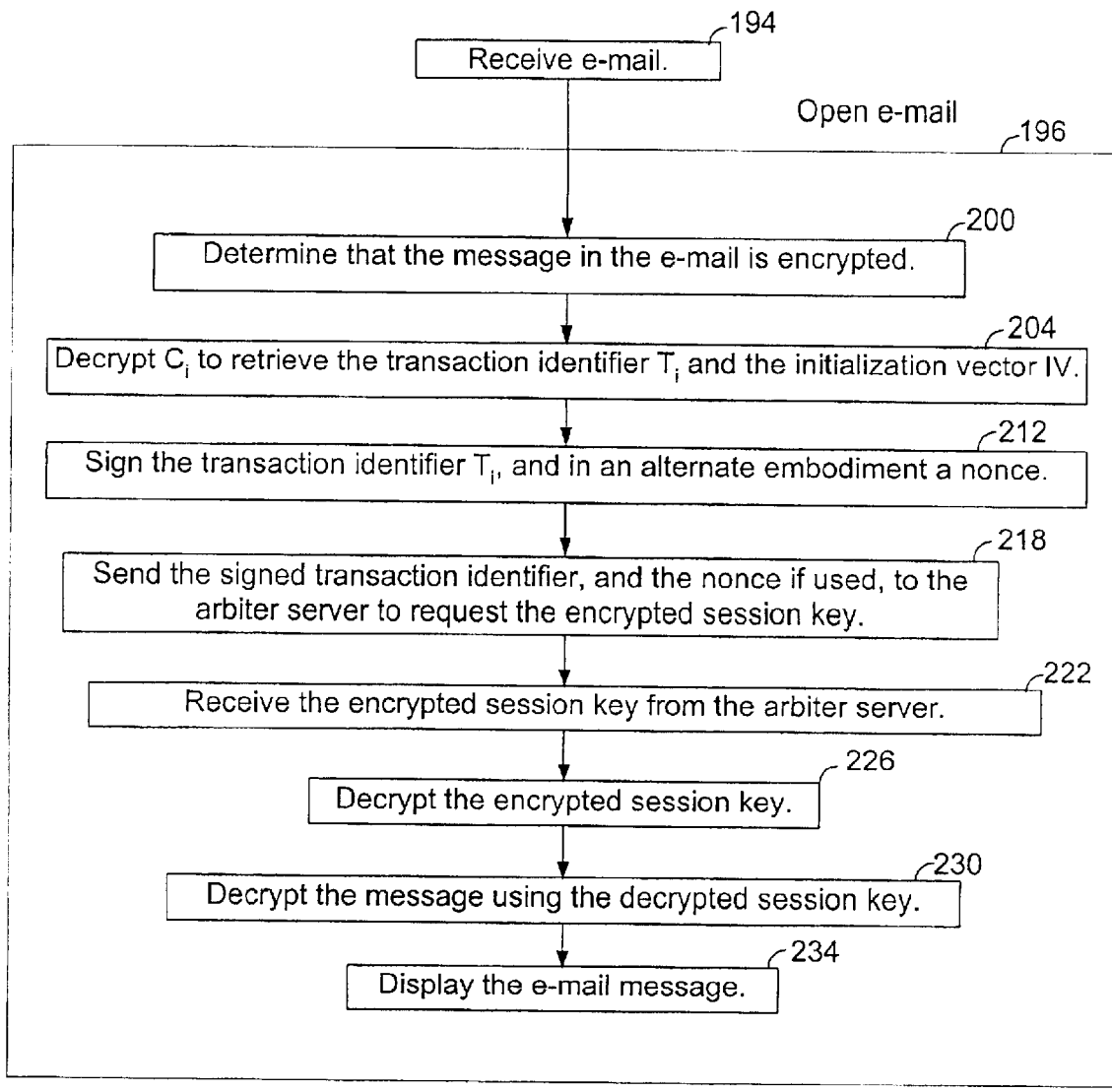
FIG. 7 depicts a high-level flowchart of a technique at the recipient computer that collectively uses the software modules and data of FIG. 6 in implementing an embodiment of the present invention.

To facilitate understanding, the reader should simultaneously refer to both FIGS. 6 and 7 throughout the following discussion. FIG. 6 also depicts a subset of software modules and data of an e-mail program 190, that executes within the recipient's computer 22 of FIG. 6, which embodies the present invention. FIG. 7 depicts a high-level flowchart of a technique at the recipient's computer 22 that collectively uses the software modules and data of FIG. 6 in implementing an embodiment of the present invention. The e-mail program of FIG. 6 is stored as executable instructions and, as appropriate, data in memory 192 of FIG. 6, and is executed within recipient client computer 22, to retrieve the encrypted session key from the arbiter server when an encrypted e-mail of the present invention is received.

Specifically, at step 194, the recipient client computer executes an e-mail program 200 which invokes a Receive_mail procedure 195 to access its associated e-mail server and download the e-mail messages on to the recipient client computer 22. The e-mail program displays the abbreviated list of the e-mail messages on the display for the recipient to review.

When the recipient attempts to open an e-mail message, such as by clicking on an e-mail item on the abbreviated list, the e-mail program executes the steps of block 196 which may be implemented by an open_mail procedure 198 of FIG. 6. In step 200, the open_mail procedure 198 determines that the message 202 in the e-mail is encrypted. For example, PGP puts a protected ("armored") message in the body of the e-mail. In this case the armor looks like: "-----BEGIN PGP ENCRYPTED MESSAGE -----." PGP searches for the first five dashes starting from the beginning of line and parses body to determine details about how message is encrypted.

In step 204, the open_mail procedure 198 decrypts the encrypted concatenation $C_i$ 204 of the transaction identifier $T_i$ and the initialization vector IV using the recipient's private key 206 to retrieve the transaction identifier $T_i$ 208 and the initialization vector IV 210. In step 212, the open_mail procedure 198 signs the transaction identifier $T_i$ 208, and the optional nonce 214 to provide a signed transaction identifier and nonce 216. In step 218, the e-mail program sends the signed transaction identifier $T_i$ and optional nonce 216, to the arbiter server to request the encrypted session key that is associated with the transaction identifier $T_i$. In one embodiment, a request_encypted_session_key procedure 220, such as an HTTP POST method, may be used to send the signed transaction identifier to the arbiter server. An exemplary, HTTP POST method will be shown below.

In step 222, the open_mail procedure 198 receives the encrypted session key 224 from the arbiter. Specifically, in one embodiment, encrypted session key 224 is received as a response to the HTTP POST method that implements the request.

In step 226, the open_mail procedure 198 decrypts the encrypted session key 222 using the recipient's private key 206 to provide a decrypted session key 228. In step 230, the open_mail procedure 198 decrypts the encrypted message 202 using the session key 228 to produce the message 230. In step 234, the e-mail program displays the e-mail message 230.

In an alternate embodiment, step 212 is omitted and in step 218, the transaction identifier $T_i$ is not signed. In yet another alternate embodiment, in step 212, only the transaction identifier $T_i$ is signed, and sent to the arbiter (step 218).

The recipient's e-mail program may also include those procedures and subroutines described with respect to FIGS. 4 and 5 to implement the sender functionality.

An exemplary HTTP POST method that requests the encrypted session key by sending the signed transaction identifier ($T_i$) is shown below. This example is implemented as MIME "multipart/signed" as defined in the "Security Multiparts for MIME: Multipart/Signed and Multipart/Encrypted", by Galvin, J., Murphy, G. K, Crocker, S., and N. Freed, RFC 1847, October 1995.

```
POST/HTTP/1.1
Accept: */*
Date: Fri, 09 Feb. 2001 08:12:31 GMT
Referer: http://arbiter.abc.com/
Content-Type: multipart/mixed; boundary=boundary_
    signed;
micalg-md5; protocol="application/pgp-signature"
Accept-Encoding: gzip, deflate
User-Agent: xxx
Host: arbiter.abc.com
Content-Length: xx
--boundary_signed
Content-Type: application/octet-string;
Content-Transfer-Encoding: base64
XXXXX [base64, T_i]
--boundary_signed
Content-Type: application/pgp-signature;
-----BEGIN PGP SIGNATURE-----
XXXXX [signature]
-----END PGP SIGNATURE-----
--boundary_signed-
```

4. Arbiter

Figure 8:
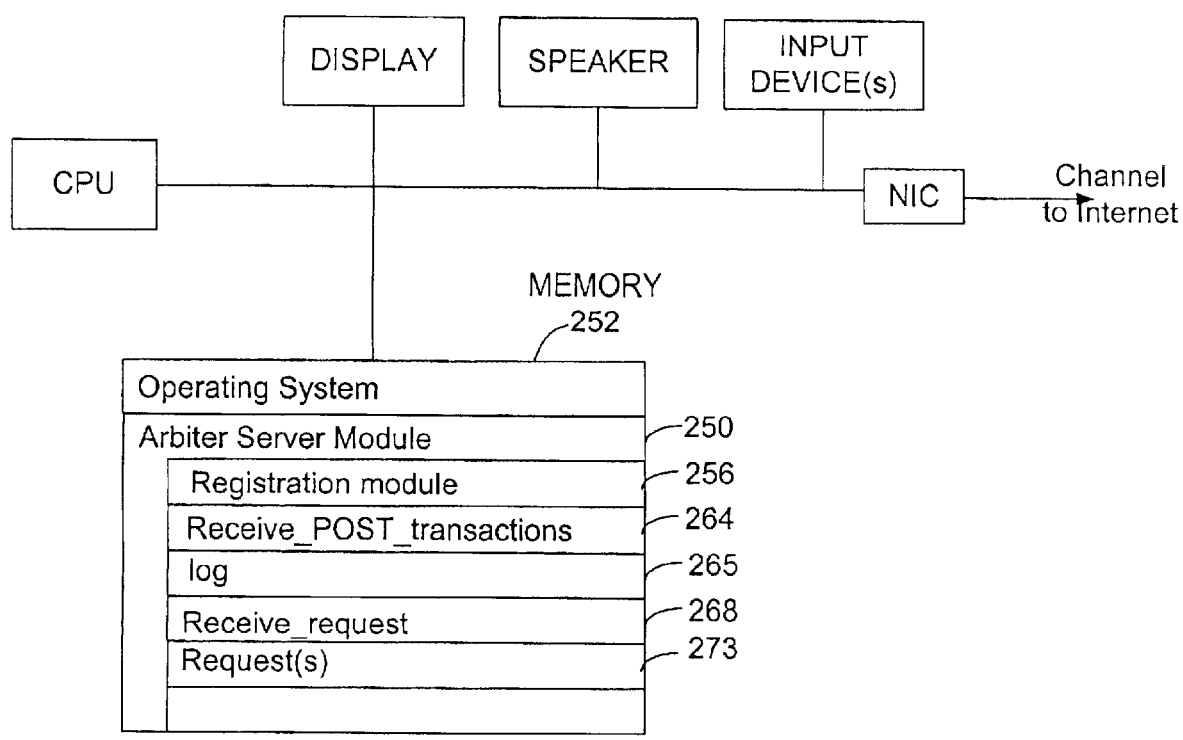
FIG. 8 depicts a high-level block diagram of a subset of software modules and data that executes within the arbiter server computer, shown in FIG. 2, in implementing an embodiment of the present invention.

FIG. 8 depicts a high-level block diagram of the arbiter server computer (PC) 40 on which the present invention can be implemented. The arbiter server computer system 40 has many of the same components as the sender's computer system, and those components will be not described again.

Figures 9, 10:
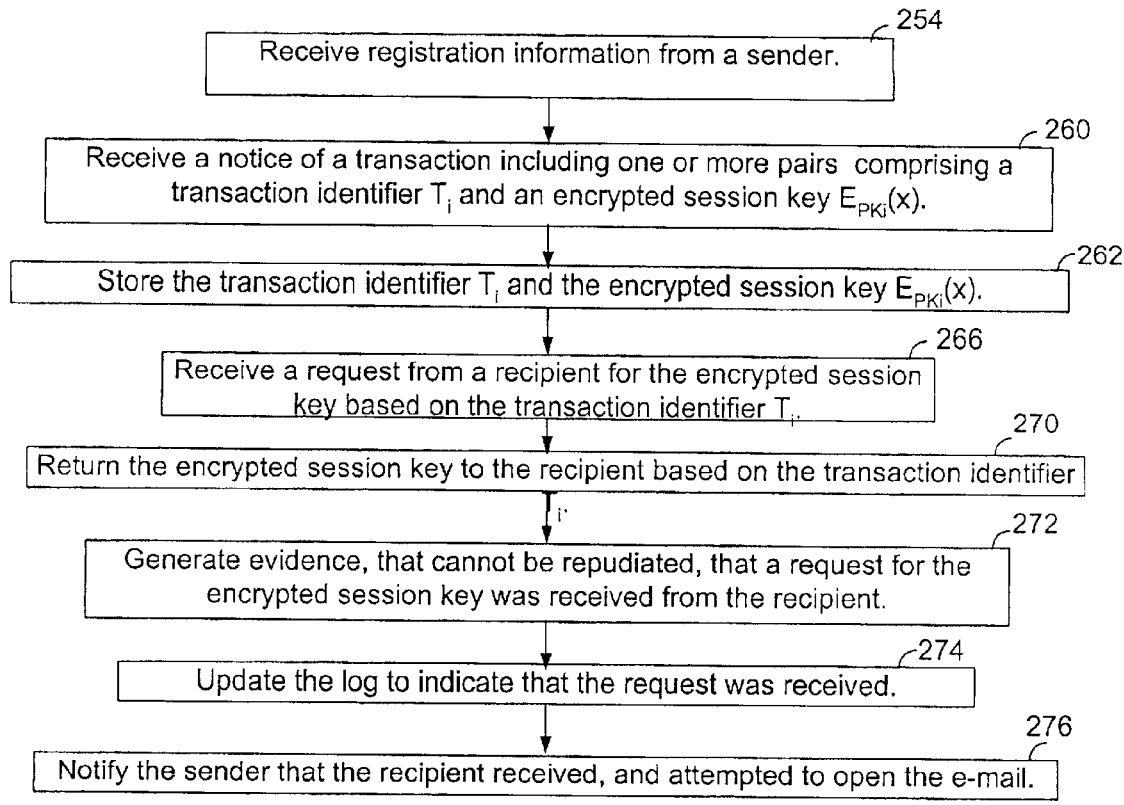
FIG. 9 depicts a high-level flowchart of a technique at the arbiter server computer that collectively use the software modules and data of FIG. 8 in implementing an embodiment of our present invention.
FIG. 10 depicts an exemplary log stored on the arbiter server of FIG. 9.

To facilitate understanding, the reader should simultaneously refer to both FIGS. 8 and 9 throughout the following discussion. FIG. 8 also depicts a subset of software modules and data of an arbiter server program, which executes within the arbiter's computer, which embodies the present invention. FIG. 9 depicts a high-level flowchart of a technique at the arbiter's computer that collectively uses the software modules and data of FIG. 8 in implementing an embodiment of the present invention. The arbiter server program 250 of FIG. 8 is stored as executable instructions and, as appropriate, data in memory 252, and as executed within arbiter server computer 40, to generate evidence that the recipient received and attempted to open an e-mail, and more specifically, that the arbiter 40 received a request for the encrypted session key from the recipient.

Initially, in step 254, the arbiter server 40 receives registration information from a sender. A sender registration module 256 stores the registration information in a database to be used to contact the sender, if needed, and to charge the sender for the arbiter service. In one embodiment, the registration is similar to the enrollment for a certificate from the Certificate Authority. The sender enters his(her) identifying information and after some time the arbiter notifies the sender that the registration was approved. The sender receives a client certificate from the arbiter to authenticate the sender to the arbiter and to manage receipts on the account.

When a sender initiates a new transaction, in step 260, the arbiter receives a notice of a transaction that comprises the transaction identifier $T_i$, the encrypted session key $E_{PKi}(X)$, and a supplemental identifier $ID_i$, if any, for each recipient i. The notice of the transaction may be implemented using the HTTP POST command from the sender. In step 262, in response to the notice, the arbiter server module 250 executes a receive_POST_transactions program 264 that stores the associated transaction identifier $T_i$, the encrypted session key $E_{PKi}(X)$, and, the supplemental identifier $ID_i$, if any, for each recipient i in a log 265 which will be discussed in further detail with reference to FIG. 10.

In step 266, the arbiter 40 receives the request from the recipient for the encrypted session key. The request includes the transaction Identifier whether signed or not depending on the embodiment. In response to receiving the request, the arbiter 40 invokes a receive_request procedure 268. The arbiter server module 250 generates evidence that the recipient received and attempted to open the e-mail by extracting the transaction identifier $T_i$ from the request. Once the transaction identifier is known, the receive_request procedure 268 searches for a matching transaction identifier in its database and returns the associated encrypted session key to that recipient (step 270).

In another embodiment, in step 272, the arbiter server module 250 stores the transaction identifier $T_i$ as proof that the recipient requested the encrypted session key. In an alternate embodiment, the arbiter server module 250 stores the body of the request 273 as proof that the recipient requested the encrypted first key. Alternately, step 272 is not performed.

In step 274, the arbiter server module 250 updates the log 265 to indicate that the request for the encrypted session key was received by recording the time when the request for the encrypted session key was received. In addition, the arbiter server module 250 may also store the recipient-supplied nonce NC, if any, and signature, if any. The arbiter server module 250 may also store the number of requests from the recipient using the same transaction identifier in the log.

In step 276, the arbiter server module 250 notifies the sender that the recipient received and attempted to open the e-mail. The notification may be by e-mail or telephone, depending on the sender's choice. Alternately, the arbiter server module 250 informs the sender that the recipient received and attempted to open an e-mail when the sender logs in to the arbiter server, rather than actively notifying the sender via e-mail or other means.

Referring to FIG. 10, the log 265 comprises the time when the request for the encrypted session key was received 280, the supplemental identifier $ID_i$ 282, if any, the transaction identifier $T_i$ 284, and the encrypted session key 286. In an alternate embodiment, the log 265 may comprise any one of, or a combination of, the recipient's signature 288 over $T_i$ 284 and recipient-supplied nonce NC 290. Also, the number of requests 292 from the recipient for the encrypted session key associated with the transaction identifier may be stored in the log.

The administrator of the arbiter server can approve new accounts, manage user's accounts, and set maximum expiration dates for return receipts. In another embodiment, requested receipts may be published on other arbiter servers. In this case, the sender specifies a primary arbiter server and the other servers are secondary. In one embodiment, the server to which the sender has identified himself is the primary arbiter server.

In yet another alternate embodiment, the sender may send his(her) HTTP post method to a first arbiter server, and the recipient(s) may send their HTTP post methods to a second arbiter server. The arbiter servers may use different protocols. In this embodiment, the arbiter servers communicate between themselves so that the second arbiter server contacts the first arbiter server to access the encrypted session key to respond to the request from the recipient.

Although various embodiments, each of which incorporates the teachings of the present invention, have been shown and described in detail herein, those skilled in the art can readily devise many other embodiments that still utilize these teachings.

I claim:

1. A method of assuring that a message sent to a recipient was requested for opening by the recipient, the method comprising:

encrypting a message using a session key to produce an encrypted message;

encrypting the session key using a public key to produce an encrypted session key;

generating a transaction identifier;

encrypting the transaction identifier to provide an encrypted transaction identifier;

sending, by the sender, the encrypted session key and the transaction identifier to an arbiter;

sending, by the sender, the encrypted message and the encrypted transaction identifier to the recipient;

generating a request for the encrypted session key based on a decrypted transaction identifier;

signing the decrypted transaction identifier;

transmitting the request to the arbiter, wherein said transmitting the request comprises sending the signed decrypted transaction identifier to the arbiter; and generating, by the arbiter, evidence that the request for the encrypted session key was received.

2. The method of claim 1 wherein the request comprises the transaction identifier and said generating evidence comprises logging that the transaction identifier was received.

3. The method of claim 1 wherein the request comprises the transaction identifier in unencrypted form such that the arbiter does not perform any cryptographic operations to extract the transaction identifier from the request.

4. The method of claim 1 wherein the arbiter does not receive the encrypted message delivered from the sender to the recipient.

5. The method of claim 1 further comprising notifying, by the arbiter, the sender of the request.

6. The method of claim 5 wherein said notifying comprises sending an e-mail to the sender.

7. A system to assure that a message was requested for opening, comprising:

a sender to send encrypted decoding information and an encrypted message;

an arbiter to store the encrypted decoding information; and a recipient to receive the encrypted message, request the encrypted decoding information, decrypt the encrypted decoding information and decrypt the encrypted message using the decrypted decoding information;

wherein the arbiter, in response to receiving the request, generates evidence that the request was received, and wherein the sender also sends a transaction identifier to the arbiter, the sender also sending an encrypted transaction identifier to the recipient, the transaction identifier being associated with the encrypted decoding information, the arbiter storing the associated transaction identifier and the encrypted decoding information, wherein the recipient decrypts the transaction identifier, signs the decrypted transaction identifier, and requests the decoding information using the transaction identifier, wherein said requesting the decoding information comprises sending the signed decrypted transaction identifier to the arbiter, and the arbiter returns the encrypted decoding information associated with that transaction identifier to the recipient.

8. A method of operating a recipient's messaging system to assure that a message sent to a recipient was requested for opening by the recipient, the method comprising:

receiving an encrypted message that was encrypted using a session key;

receiving an encrypted transaction identifier associated with the encrypted message;

decrypting the transaction identifier;

generating a request for the encrypted session key based on the decrypted transaction identifier;

signing the decrypted transaction identifier;

transmitting the request to an arbiter, wherein said transmitting the request comprises sending the signed decrypted transaction identifier to the arbiter;

receiving the encrypted session key;

decrypting the encrypted session key to provide a decrypted session key; and decrypting the encrypted message using the decrypted session key.

9. A method of operating a sender's messaging system to assure that a message sent to a recipient was requested for opening by the recipient, the method comprising:

encrypting a message using a session key to provide an encrypted message;

encrypting the session key to provide an encrypted session key;

generating a transaction identifier;

encrypting the transaction identifier to provide an encrypted transaction identifier;

sending the encrypted transaction identifier and the encrypted session key to an arbiter server;

sending the encrypted message and the encrypted session key to a recipient; and receiving a notification, from the arbiter, in response to a request from the recipient for the encrypted session key based on the decrypted transaction identifier, wherein the recipient signs the decrypted transaction identifier and transmits the request comprising sending the signed decrypted transaction identifier to the arbiter.

10. A method of operating a messaging system on an arbiter server to assure that a message sent to a recipient was requested for opening by the recipient, the method comprising:

receiving a transaction identifier and an associated encrypted session key;

receiving a request, from recipient, to send the encrypted session key to that recipient, the request comprising the transaction identifier, wherein the recipient has decrypted the transaction identifier and signed the decrypted transaction identifier, and wherein the recipient transmitting the request comprises sending the signed decrypted transaction identifier to the arbiter;

returning, in response to the request, the encrypted session key associated with the transaction identifier in the request; and generating evidence that the request to send the encrypted session key was received.

11. A recipient's messaging system comprising:

a memory operable to store instructions and data;

a processor operable to execute the instructions stored in the memory to perform the steps of:

storing an encrypted message that was received from a sender;

decrypt decrypting an encrypted transaction identifier to provide a decrypted transaction identifier;

generate generating a request for an encrypted session key based on the transaction identifier;

transmitting the request to an arbiter, wherein said transmitting the request comprises sending the signed decrypted transaction identifier to the arbiter;

receiving the encrypted session key;

decrypting the encrypted session key to provide a decrypted session key; and decrypting the encrypted message using the decrypted session key.

12. A sender's messaging system comprising:

a memory operable to store instructions and data;

a processor operable to execute the instructions stored in the memory to perform the steps of:

encrypting a message using a session key to provide an encrypted message;

encrypting the session key to provide an encrypted session key;

generating a transaction identifier;

encrypting the transaction identifier to provide an encrypted transaction identifier;

transmitting the transaction identifier and the encrypted session key to an arbiter server;

transmitting the encrypted message, the encrypted transaction identifier and the encrypted session key to a recipient; and receiving a notification, from the arbiter, in response to a request from the recipient for the encrypted session key based on the transaction identifier, wherein the recipient has decrypted the encrypted transaction identifier, signed the decrypted transaction identifier, and transmitted the request comprising the signed decrypted transaction identifier to the arbiter.

13. An arbiter comprising:

a memory operable to store instructions and data;

a processor operable to execute the instructions stored in the memory to perform the steps of:

receiving a transaction identifier and an encrypted session key; and receiving a request, from at least one recipient, to send the encrypted session key to that recipient, the request comprising the transaction identifier associated with that recipient, wherein the recipient has decrypted the transaction identifier, signed the decrypted transaction identifier, and transmitted the request comprises sending the signed decrypted transaction identifier to the arbiter.

14. The arbiter of claim 13 further comprising:

one or more instructions to return, in response to the request, the encrypted session key associated with the transaction identifier in the request.

15. The arbiter of claim 13 further comprising:

one or more instructions to generate evidence that the request to send the encrypted session key was received by matching stored transaction identifiers with the transaction identifier from the request and logging that the request was received.

16. An article of manufacture comprising a computer usable medium having computer readable program code embodied therein for assuring that a message sent to a recipient was received by the recipient, comprising instructions to:

encrypt a message using a session key to produce an encrypted message;

encrypt the session key using a public key to produce an encrypted session key;

generate a transaction identifier;

encrypt the transaction identifier to provide an encrypted transaction identifier;

send the encrypted session key and the transaction identifier to an arbiter;

send the encrypted message and the encrypted transaction identifier to a recipient;

generate a request for the encrypted session key based on a decrypted transaction identifier;

sign the decrypted transaction identifier;

transmit the request to the arbiter, wherein said transmitting the request comprises sending the signed decrypted transaction identifier to the arbiter; and generate, by the arbiter, evidence that a request for the encrypted session key was received.

17. The article of manufacture of claim 16 further comprising instructions to notify the sender that the request was received.

18. An article of manufacture comprising a computer usable medium having computer readable program code embodied therein for operating a recipient computer system to assure a sender that a message sent to the recipient was received by the recipient, comprising instructions to:

decrypt an encrypted transaction identifier to provide a decrypted transaction identifier;

generate a request for an encrypted session key based on a decrypted transaction identifier;

sign the decrypted transaction identifier;

transmit the request to an arbiter, wherein said transmitting the request comprises sending the signed decrypted transaction identifier to the arbiter;

receive the encrypted session key;

decrypt the encrypted session key to provide a decrypted session key; and decrypt the encrypted message using the decrypted session key.

19. An article of manufacture comprising a computer usable medium having computer readable program code embodied therein for operating a sender's computer system to assure the sender that a message sent to a recipient was received by the recipient, comprising instructions to:

encrypt a message using a session key to provide an encrypted message;

encrypt the session key to provide an encrypted session key;

generate a transaction identifier;

encrypt the transaction identifier to provide an encrypted transaction identifier;

send the encrypted transaction identifier and the encrypted session key to an arbiter server;

send the encrypted message and the encrypted session key to a recipient; and receive a notification, from the arbiter, in response to a request from the recipient for the encrypted session key based on the decrypted transaction identifier, wherein the recipient signs the decrypted transaction identifier and transmits the request comprising sending the signed decrypted transaction identifier to the arbiter.

20. An article of manufacture comprising a computer usable medium having computer readable program code embodied therein for operating an arbiter computer system to assure the sender that a message sent to a recipient was received by the recipient, comprising instructions to:

receive a transaction identifier and an encrypted session key; and receive a request, from at least one recipient, to send the encrypted session key to that recipient, the request comprising the transaction identifier associated with that recipient, wherein the recipient has decrypted the transaction identifier and signed the decrypted transaction identifier, and wherein the recipient transmitting the request comprises sending the signed decrypted transaction identifier to the arbiter.

21. The article of manufacture of claim 20 further comprising one or more instructions to return, in response to the request, the encrypted session key associated with the transaction identifier in the request to the recipient.

22. The article of manufacture of claim 20 further comprising one or more instructions to generate evidence that the request to send the encrypted session key was received.

23. A method of assuring that a message sent to a recipient was requested for opening by the recipient, the method comprising:

encrypting a message using a session key to produce an encrypted message;

encrypting the session key using a public key to produce an encrypted session key;

generating a transaction identifier;

encrypting the transaction identifier to provide an encrypted transaction identifier;

sending, by the sender, the encrypted session key and the transaction identifier to an arbiter;

sending, by the sender, the encrypted message and the encrypted transaction identifier to the recipient;

generating a request for the encrypted session key based on the transaction identifier;

transmitting the request to the arbiter, wherein the request is repeatedly transmitted for a predetermined period of time by the recipient until the encrypted session key is received; and generating, by the arbiter, evidence that the request for the encrypted session key was received.

24. A method of assuring that a message sent to a recipient was requested for opening by the recipient, the method comprising:

encrypting a message using a session key to produce an encrypted message;

encrypting the session key using a public key to produce an encrypted session key;

generating a transaction identifier;

encrypting the transaction identifier to provide an encrypted transaction identifier;

sending, by the sender, the encrypted session key and the transaction identifier to an arbiter;

sending, by the sender, the encrypted message and the encrypted transaction identifier to the recipient;

generating a request for the encrypted session key based on the transaction identifier, wherein said generating the request comprises:
  decrypting, using the recipient's private key, the transaction identifier from the encrypted transaction identifier to provide a decrypted transaction identifier,
  signing the decrypted transaction identifier and a nonce associated with that recipient, and
  sending the signed decrypted transaction identifier and the nonce to the arbiter;
sending the request to the arbiter; and
generating, by the arbiter, evidence that the request for the encrypted session key was received.

25. A system to assure that a message was requested for opening, comprising:
  a sender to send encrypted decoding information and an encrypted message;
  an arbiter to store the encrypted decoding information; and
  a recipient to receive the encrypted message, request the encrypted decoding information, decrypt the encrypted decoding information and decrypt the encrypted message using the decrypted decoding information;
  wherein the arbiter, in response to receiving the request, generates evidence that the request was received, and wherein the sender also sends a transaction identifier to the arbiter, the sender also sending an encrypted transaction identifier to the recipient, the transaction identifier being associated with the encrypted decoding information, the arbiter storing the associated transaction identifier and the encrypted decoding information, wherein the recipient decrypts the transaction identifier and requests the decoding information using the transaction identifier, and the arbiter returns the encrypted decoding information associated with that transaction identifier to the recipient, wherein the decoding information is repeatedly requested for a predetermined period of time by the recipient until the encrypted decoding information is received.

26. A system to assure that a message was requested for opening, comprising:
  a sender to send encrypted decoding information and an encrypted message;
  an arbiter to store the encrypted decoding information; and
  a recipient to receive the encrypted message, request the encrypted decoding information, decrypt the encrypted decoding information and decrypt the encrypted message using the decrypted decoding information;
  wherein the arbiter, in response to receiving the request, generates evidence that the request was received, and wherein the sender also sends a transaction identifier to the arbiter, the sender also sending an encrypted transaction identifier to the recipient, the transaction identifier being associated with the encrypted decoding information, the arbiter storing the associated transaction identifier and the encrypted decoding information, wherein the recipient decrypts the transaction identifier and requests the decoding information using the transaction identifier, and the arbiter returns the encrypted decoding information associated with that transaction identifier to the recipient, wherein the request is generated by:
    decrypting, using the recipient's private key, the transaction identifier from the encrypted transaction identifier to provide a decrypted transaction identifier;
    signing the decrypted transaction identifier and a nonce associated with that recipient; and
    sending the signed decrypted transaction identifier and the nonce to the arbiter.

27. A method of operating a recipient's messaging system to assure that a message sent to a recipient was requested for opening by the recipient, the method comprising:
  receiving an encrypted message that was encrypted using a session key;
  receiving an encrypted transaction identifier associated with the encrypted message;
  decrypting the transaction identifier;
  generating a request for the encrypted session key based on the transaction identifier;
  transmitting the request to an arbiter, wherein the request is repeatedly transmitted for a predetermined period of time by the recipient until the encrypted session key is received;
  receiving the encrypted session key;
  decrypting the encrypted session key to provide a decrypted session key; and
  decrypting the encrypted message using the decrypted session key.

28. A method of operating a recipient's messaging system to assure that a message sent to a recipient was requested for opening by the recipient, the method comprising:
  receiving an encrypted message that was encrypted using a session key;
  receiving an encrypted transaction identifier associated with the encrypted message;
  decrypting the transaction identifier;
  generating a request for the encrypted session key based on the transaction identifier, wherein said generating the request comprises:
    decrypting, using the recipient's private key, the transaction identifier from the encrypted transaction identifier to provide a decrypted transaction identifier,
    signing the decrypted transaction identifier and a nonce associated with that recipient, and
    sending the signed decrypted transaction identifier and the nonce to the arbiter;
  sending the request to an arbiter;
  receiving the encrypted session key;
  decrypting the encrypted session key to provide a decrypted session key; and
  decrypting the encrypted message using the decrypted session key.

29. A method of operating a sender's messaging system to assure that a message sent to a recipient was requested for opening by the recipient, the method comprising:
  encrypting a message using a session key to provide an encrypted message;
  encrypting the session key to provide an encrypted session key;
  generating a transaction identifier;
  encrypting the transaction identifier to provide an encrypted transaction identifier;
  sending the encrypted transaction identifier and the encrypted session key to an arbiter server;
  sending the encrypted message and the encrypted session key to a recipient; and
  receiving a notification, from the arbiter, in response to a request from the recipient for the encrypted session key based on the transaction identifier, wherein the request is repeatedly transmitted for a predetermined period of time by the recipient until the encrypted session key is received.

30. A method of operating a sender's messaging system to assure that a message sent to a recipient was requested for opening by the recipient, the method comprising:
   encrypting a message using a session key to provide an encrypted message;
   encrypting the session key to provide an encrypted session key;
   generating a transaction identifier;
   encrypting the transaction identifier to provide an encrypted transaction identifier;
   sending the encrypted transaction identifier and the encrypted session key to an arbiter server;
   sending the encrypted message and the encrypted session key to a recipient; and
   receiving a notification, from the arbiter, in response to a request from the recipient for the encrypted session key based on the transaction identifier, wherein the recipient generates the request by:
      decrypting, using the recipient's private key, the transaction identifier from the encrypted transaction identifier to provide a decrypted transaction identifier;
      signing the decrypted transaction identifier and a nonce associated with that recipient; and
      sending the signed decrypted transaction identifier and the nonce to the arbiter.

31. A method of operating a messaging system on an arbiter server to assure that a message sent to a recipient was requested for opening by the recipient, the method comprising:
   receiving a transaction identifier and an associated encrypted session key;
   receiving a request, from a recipient, to send the encrypted session key to that recipient, the request comprising the transaction identifier, wherein the request is repeatedly transmitted for a predetermined period of time by the recipient until the encrypted session key is received;
   returning, in response to the request, the encrypted session key associated with the transaction identifier in the request; and
   generating evidence that the request to send the encrypted session key was received.

32. A method of operating a messaging system on an arbiter server to assure that a message sent to a recipient was requested for opening by the recipient, the method comprising:
   receiving a transaction identifier and an associated encrypted session key;
   receiving a request, from a recipient, to send the encrypted session key to that recipient, the request comprising the transaction identifier, wherein the recipient generates the request by:
      decrypting, using the recipient's private key, the transaction identifier from the encrypted transaction identifier to provide a decrypted transaction identifier,
      signing the decrypted transaction identifier and a nonce associated with that recipient, and
      sending the signed decrypted transaction identifier and the nonce to the arbiter;
   returning, in response to the request, the encrypted session key associated with the transaction identifier in the request; and
   generating evidence that the request to send the encrypted session key was received.

33. A recipient's messaging system comprising:
   a memory operable to store instructions and data;
   a processor operable to execute the instructions stored in the memory to perform the steps of:
      storing an encrypted message that was received from a sender;
      decrypting an encrypted transaction identifier to provide a decrypted transaction identifier;
      generating a request for an encrypted session key based on the transaction identifier;
      transmitting the request to an arbiter, wherein the request is repeatedly transmitted for a predetermined period of time by the recipient until the encrypted session key is received;
      receiving the encrypted session key;
      decrypting the encrypted session key to provide a decrypted session key; and
      decrypting the encrypted message using the decrypted session key.

34. A recipient's messaging system comprising:
   a memory operable to store instructions and data;
   a processor operable to execute the instructions stored in the memory to perform the steps of:
      storing an encrypted message that was received from a sender;
      decrypting an encrypted transaction identifier to provide a decrypted transaction identifier;
      generating a request for an encrypted session key based on the transaction identifier, wherein said generating the request comprises:
         decrypting, using the recipient's private key, the transaction identifier from the encrypted transaction identifier to provide a decrypted transaction identifier,
         signing the decrypted transaction identifier and a nonce associated with that recipient, and
         sending the signed decrypted transaction identifier and the nonce to the arbiter;
      transmitting the request to an arbiter;
      receiving the encrypted session key;
      decrypting the encrypted session key to provide a decrypted session key; and
      decrypting the encrypted message using the decrypted session key.

35. A sender's messaging system comprising:
   a memory operable to store instructions and data;
   a processor operable to execute the instructions stored in the memory to perform the steps of:
      encrypting a message using a session key to provide an encrypted message;
      encrypting the session key to provide an encrypted session key;
      generating a transaction identifier;
      encrypting the transaction identifier to provide an encrypted transaction identifier;
      transmitting the transaction identifier and the encrypted session key to an arbiter server;
      transmitting the encrypted message, the encrypted transaction identifier and the encrypted session key to a recipient; and
      receiving a notification, from the arbiter, in response to a request from the recipient for the encrypted session key based on the transaction identifier wherein the recipient repeatedly transmits the request for a predetermined period of time until the encrypted session key is received.

36. A sender's messaging system comprising:
a memory operable to store instructions and data;
a processor operable to execute the instructions stored in the memory to perform the steps of:
encrypting a message using a session key to provide an encrypted message;
encrypting the session key to provide an encrypted session key;
generating a transaction identifier;
encrypting the transaction identifier to provide an encrypted transaction identifier;
transmitting the transaction identifier and the encrypted session key to an arbiter server;
transmitting the encrypted message, the encrypted transaction identifier and the encrypted session key to a recipient; and
receiving a notification, from the arbiter, in response to a request from the recipient for the encrypted session key based on the transaction identifier wherein the recipient generates the request by:
  decrypting, using the recipient's private key, the transaction identifier from the encrypted transaction identifier to provide a decrypted transaction identifier;
  signing the decrypted transaction identifier and a nonce associated with that recipient; and
  sending the signed decrypted transaction identifier and the nonce to the arbiter.

37. An arbiter comprising:
a memory operable to store instructions and data;
a processor operable to execute the instructions stored in the memory to perform the steps of:
receiving a transaction identifier and an encrypted session key; and
receiving a request, from at least one recipient, to send the encrypted session key to that recipient, the request comprising the transaction identifier associated with that recipient, wherein the recipient repeatedly transmits the request for a predetermined period of time until the encrypted session key is received.

38. An arbiter comprising:
a memory operable to store instructions and data;
a processor operable to execute the instructions stored in the memory to perform the steps of:
receiving a transaction identifier and an encrypted session key; and
receiving a request, from at least one recipient, to send the encrypted session key to that recipient, the request comprising the transaction identifier associated with that recipient, wherein the request generates the request by:
  decrypting, using the recipient's private key, the transaction identifier from the encrypted transaction identifier to provide a decrypted transaction identifier;
  signing the decrypted transaction identifier and a nonce associated with that recipient; and
  sending the signed decrypted transaction identifier and the nonce to the arbiter.

39. An article of manufacture comprising a computer usable medium having computer readable program code embodied therein for assuring that a message sent to a recipient was received by the recipient, comprising instructions to:
encrypt a message using a session key to produce an encrypted message;
encrypt the session key using a public key to produce an encrypted session key;
generate a transaction identifier;
encrypt the transaction identifier to provide an encrypted transaction identifier;
send the encrypted session key and the transaction identifier to an arbiter;
send the encrypted message and the encrypted transaction identifier to a recipient;
generate a request for the encrypted session key based on the transaction identifier;
transmit the request to the arbiter, wherein the request is repeatedly transmitted for a predetermined period of time by the recipient until the encrypted session key is received; and
generate, by the arbiter, evidence that a request for the encrypted session key was received.

40. An article of manufacture comprising a computer usable medium having computer readable program code embodied therein for assuring that a message sent to a recipient was received by the recipient, comprising instructions to:
encrypt a message using a session key to produce an encrypted message;
encrypt the session key using a public key to produce an encrypted session key;
generate a transaction identifier;
encrypt the transaction identifier to provide an encrypted transaction identifier;
send the encrypted session key and the transaction identifier to an arbiter;
send the encrypted message and the encrypted transaction identifier to a recipient;
generate a request for the encrypted session key based on the transaction identifier, wherein said generating the request comprises:
  decrypting, using the recipient's private key, the transaction identifier from the encrypted transaction identifier to provide a decrypted transaction identifier,
  signing the decrypted transaction identifier and a nonce associated with that recipient, and
  sending the signed decrypted transaction identifier and the nonce to the arbiter;
send the request to the arbiter; and
generate, by the arbiter, evidence that a request for the encrypted session key was received.

41. An article of manufacture comprising a computer usable medium having computer readable program code embodied therein for operating a recipient computer system to assure a sender that a message sent to the recipient was received by the recipient, comprising instructions to:
decrypt an encrypted transaction identifier to provide a decrypted transaction identifier;
generate a request for an encrypted session key based on the transaction identifier;
transmit the request to an arbiter, wherein the request is repeatedly transmitted for a predetermined period of time by the recipient until the encrypted session key is received;
receive the encrypted session key;
decrypt the encrypted session key to provide a decrypted session key; and decrypt the encrypted message using the decrypted session key.

42. An article of manufacture comprising a computer usable medium having computer readable program code embodied therein for operating a recipient computer system to assure a sender that a message sent to the recipient was received by the recipient, comprising instructions to:
  decrypt an encrypted transaction identifier to provide a decrypted transaction identifier;
  generate a request for an encrypted session key based on the transaction identifier, wherein said generating the request comprises:
    decrypting, using the recipient's private key, the transaction identifier from the encrypted transaction identifier to provide a decrypted transaction identifier,
    signing the decrypted transaction identifier and a nonce associated with that recipient, and
    sending the signed decrypted transaction identifier and the nonce to the arbiter;
  transmit the request to an arbiter;
  receive the encrypted session key;
  decrypt the encrypted session key to provide a decrypted session key; and
  decrypt the encrypted message using the decrypted session key.

43. An article of manufacture comprising a computer usable medium having computer readable program code embodied therein for operating a sender's computer system to assure the sender that a message sent to a recipient was received by the recipient, comprising instructions to:
  encrypt a message using a session key to provide an encrypted message;
  encrypt the session key to provide an encrypted session key;
  generate a transaction identifier;
  encrypt the transaction identifier to provide an encrypted transaction identifier;
  send the encrypted transaction identifier and the encrypted session key to an arbiter server;
  send the encrypted message and the encrypted session key to a recipient; and
  receive a notification, from the arbiter, in response to a request from the recipient for the encrypted session key based on the transaction identifier, wherein the request is repeatedly transmitted for a predetermined period of time by the recipient until the encrypted session key is received.

44. An article of manufacture comprising a computer usable medium having computer readable program code embodied therein for operating a sender's computer system to assure the sender that a message sent to a recipient was received by the recipient, comprising instructions to:
  encrypt a message using a session key to provide an encrypted message;
  encrypt the session key to provide an encrypted session key;
  generate a transaction identifier;
  encrypt the transaction identifier to provide an encrypted transaction identifier;
  send the encrypted transaction identifier and the encrypted session key to an arbiter server;
  send the encrypted message and the encrypted session key to a recipient; and
  receive a notification, from the arbiter, in response to a request from the recipient for the encrypted session key based on the transaction identifier, wherein the recipient generates the request by:
    decrypting, using the recipient's private key, the transaction identifier from the encrypted transaction identifier to provide a decrypted transaction identifier;
    signing the decrypted transaction identifier and a nonce associated with that recipient; and
    sending the signed decrypted transaction identifier and the nonce to the arbiter.

45. An article of manufacture comprising a computer usable medium having computer readable program code embodied therein for operating an arbiter computer system to assure the sender that a message sent to a recipient was received by the recipient, comprising instructions to:
  receive a transaction identifier and an encrypted session key; and
  receive a request, from a recipient, to send the encrypted session key to that recipient, the request comprising the transaction identifier, wherein the request is repeatedly transmitted for a predetermined period of time by the recipient until the encrypted session key is received.

46. An article of manufacture comprising a computer usable medium having computer readable program code embodied therein for operating an arbiter computer system to assure the sender that a message sent to a recipient was received by the recipient, comprising instructions to:
  receive a transaction identifier and an encrypted session key; and
  receive a request, from a recipient, to send the encrypted session key to that recipient, the request comprising the transaction identifier, wherein the recipient generates the request by:
    decrypting, using the recipient's private key, the transaction identifier from the encrypted transaction identifier to provide a decrypted transaction identifier,
    signing the decrypted transaction identifier and a nonce associated with that recipient, and
    sending the signed decrypted transaction identifier and the nonce to the arbiter;
  returning, in response to the request, the encrypted session key associated with the transaction identifier in the request.

* * * * *